US010289194B2

(12) United States Patent
McCracken et al.

(10) Patent No.: US 10,289,194 B2
(45) Date of Patent: May 14, 2019

(54) GAMEPLAY RIDE VEHICLE SYSTEMS AND METHODS

(71) Applicant: Universal City Studios LLC, Universal City, CA (US)

(72) Inventors: Sean David McCracken, Winter Garden, FL (US); Eric Lawrence Merz, Celebration, FL (US); Patrick Devin Boyle, Orlando, FL (US); Justin Michael Schwartz, Orlando, FL (US); Thomas Martin Geraghty, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/912,281

(22) Filed: Mar. 5, 2018

(65) Prior Publication Data
US 2018/0253905 A1    Sep. 6, 2018

Related U.S. Application Data

(60) Provisional application No. 62/467,817, filed on Mar. 6, 2017.

(51) Int. Cl.
*A63G 31/16* (2006.01)
*G06F 3/01* (2006.01)
(Continued)

(52) U.S. Cl.
CPC ............ *G06F 3/011* (2013.01); *A63F 13/211* (2014.09); *A63F 13/213* (2014.09);
(Continued)

(58) Field of Classification Search
CPC .......... A63G 7/00; A63G 31/00; A63G 31/16; A63G 31/02; G02B 27/0172;
(Continued)

(56) References Cited

U.S. PATENT DOCUMENTS 5,716,281 A * 2/1998 Dote .......................... F41J 9/14
463/2
5,785,592 A * 7/1998 Jacobsen ............... A63F 9/0291
273/349

(Continued)

FOREIGN PATENT DOCUMENTS

EP    2138213 A1    12/2009
EP    2189200 A1    5/2010
(Continued)

OTHER PUBLICATIONS

Fred H. Previc et al: "Spatial Disorientation in Aviation, vol. 203 of Progress in astronautics and aeronautics", p. 476, XP055489810, Jan. 1, 2004.
(Continued)

*Primary Examiner* — Kien T Nguyen
(74) *Attorney, Agent, or Firm* — Fletcher Yoder, P.C.

(57) ABSTRACT

A ride system for an amusement park includes a ride vehicle configured to accommodate a rider and configured to travel along a ride path, a head mounted display configured to be worn by the rider, and a control system. The control system is configured to display a virtual instruction to the rider via the head mounted display, receive a signal from a user input device associated with the rider, determine that the signal received from the user input device corresponds to the virtual instruction, and trigger a movement of the ride vehicle in response to determining that the signal corresponds to the virtual instruction.

20 Claims, 7 Drawing Sheets

(51) Int. Cl.
- *G06T 19/00* (2011.01)
- *A63G 7/00* (2006.01)
- *G02B 27/01* (2006.01)
- *A63F 13/213* (2014.01)
- *A63F 13/26* (2014.01)
- *A63F 13/30* (2014.01)
- *G06F 3/0484* (2013.01)
- *H04N 13/344* (2018.01)
- *A63F 13/25* (2014.01)
- *A63F 13/211* (2014.01)
- *A63F 13/837* (2014.01)
- *A63F 13/245* (2014.01)
- *A63F 13/355* (2014.01)
- *A63F 13/843* (2014.01)
- *A63F 13/5255* (2014.01)
- *A63G 27/00* (2006.01)
- *A63G 31/00* (2006.01)
- *G06F 1/16* (2006.01)
- *G06G 3/00* (2006.01)
- *G06F 3/0481* (2013.01)

(52) U.S. Cl.
CPC ............ *A63F 13/245* (2014.09); *A63F 13/25* (2014.09); *A63F 13/26* (2014.09); *A63F 13/30* (2014.09); *A63F 13/355* (2014.09); *A63F 13/5255* (2014.09); *A63F 13/837* (2014.09); *A63F 13/843* (2014.09); *A63G 7/00* (2013.01); *A63G 27/00* (2013.01); *A63G 31/00* (2013.01); *A63G 31/16* (2013.01); *G02B 27/0101* (2013.01); *G02B 27/017* (2013.01); *G02B 27/0172* (2013.01); *G06F 1/163* (2013.01); *G06F 3/012* (2013.01); *G06F 3/04845* (2013.01); *G06T 19/006* (2013.01); *H04N 13/344* (2018.05); *A63F 2300/6653* (2013.01); *G02B 2027/014* (2013.01); *G02B 2027/0138* (2013.01); *G02B 2027/0141* (2013.01); *G02B 2027/0145* (2013.01); *G02B 2027/0178* (2013.01); *G06F 3/04815* (2013.01); *G06F 2203/04806* (2013.01); *G06T 2219/024* (2013.01)

(58) Field of Classification Search
CPC ............... G02B 27/0176; G02B 27/01; G02B 27/0178; G09B 5/003
USPC .................. 472/43, 59–61, 130; 434/29, 55; 345/7–8, 419
See application file for complete search history.

(56) References Cited

U.S. PATENT DOCUMENTS

| | | | |
|---|---|---|---|
| 5,844,530 A | 12/1998 | Tosaki | |
| 6,179,619 B1 * | 1/2001 | Tanaka | A63G 7/00 434/307 R |
| 6,220,965 B1 * | 4/2001 | Hanna | A63G 7/00 463/52 |
| 6,462,769 B1 * | 10/2002 | Trowbridge | A63G 31/16 348/51 |
| 6,533,670 B1 | 3/2003 | Drobnis | |
| 6,606,953 B2 | 8/2003 | Mares | |
| 6,796,908 B2 * | 9/2004 | Weston | A63G 7/00 434/55 |
| 7,495,638 B2 | 2/2009 | Lamvik et al. | |
| 7,955,168 B2 | 6/2011 | Mendelsohn et al. | |
| 8,025,581 B2 | 9/2011 | Bryan et al. | |
| 8,066,576 B2 | 11/2011 | Threlkel | |
| 8,212,859 B2 | 7/2012 | Tang et al. | |
| 8,491,403 B2 | 7/2013 | Schreibfeder | |
| 8,511,827 B2 | 8/2013 | Hua et al. | |
| 8,576,276 B2 | 11/2013 | Bar-Zeev et al. | |
| 8,705,177 B1 | 4/2014 | Miao | |
| 8,767,014 B2 | 7/2014 | Vaught et al. | |
| 8,810,482 B2 | 8/2014 | Abdollahi et al. | |
| 8,867,139 B2 | 10/2014 | Gupta | |
| 8,894,492 B2 | 11/2014 | Ackley et al. | |
| 8,941,559 B2 | 1/2015 | Bar-Zeev et al. | |
| 9,052,505 B2 | 6/2015 | Cheng et al. | |
| 9,092,953 B1 | 7/2015 | Mortimer et al. | |
| 9,155,971 B1 | 10/2015 | Trowbridge | |
| 9,253,524 B2 | 2/2016 | Kaburlasos et al. | |
| 9,266,028 B2 | 2/2016 | Alfieri et al. | |
| 9,268,138 B2 | 2/2016 | Shimizu et al. | |
| 9,285,871 B2 | 3/2016 | Geisner et al. | |
| 9,286,730 B2 | 3/2016 | Bar-Zeev et al. | |
| 9,292,973 B2 | 3/2016 | Bar-Zeev et al. | |
| 9,310,591 B2 | 4/2016 | Hua et al. | |
| 9,316,834 B2 | 4/2016 | Makino et al. | |
| 9,342,610 B2 | 5/2016 | Liu et al. | |
| 9,354,446 B2 | 5/2016 | Abdollahi et al. | |
| 9,360,671 B1 | 6/2016 | Zhou | |
| 9,366,870 B2 | 6/2016 | Cheng et al. | |
| 9,366,871 B2 | 6/2016 | Ghosh et al. | |
| 9,383,582 B2 | 7/2016 | Tang et al. | |
| 9,389,423 B2 | 7/2016 | Bhardwaj et al. | |
| 9,395,811 B2 | 7/2016 | Vaught et al. | |
| 9,454,010 B1 | 9/2016 | Passmore et al. | |
| 9,497,501 B2 | 11/2016 | Mount et al. | |
| 9,519,144 B2 | 12/2016 | Lanman et al. | |
| 9,569,886 B2 | 2/2017 | Akenine-Moller et al. | |
| 9,582,922 B2 | 2/2017 | Lanman et al. | |
| 9,588,341 B2 | 3/2017 | Bar-Zeev et al. | |
| 9,606,362 B2 | 3/2017 | Passmore et al. | |
| 9,638,921 B2 | 5/2017 | Miller et al. | |
| 9,658,460 B2 | 5/2017 | Lee et al. | |
| 9,690,371 B2 | 6/2017 | Saito | |
| 9,690,374 B2 | 6/2017 | Clement et al. | |
| 9,690,375 B2 | 6/2017 | Blum et al. | |
| 9,733,477 B2 | 8/2017 | Gupta | |
| 9,733,480 B2 | 8/2017 | Baek et al. | |
| 9,733,481 B2 | 8/2017 | Carollo et al. | |
| 9,741,125 B2 | 8/2017 | Baruch et al. | |
| 9,763,342 B2 | 9/2017 | Long et al. | |
| 9,778,467 B1 | 10/2017 | White et al. | |
| 9,839,857 B2 | 12/2017 | Wagner | |
| 9,864,406 B2 | 1/2018 | Miller et al. | |
| 9,869,862 B2 | 1/2018 | Cheng et al. | |
| 9,874,749 B2 | 1/2018 | Bradski et al. | |
| 9,877,016 B2 | 1/2018 | Esteban et al. | |
| 9,885,871 B2 | 2/2018 | Abdollahi et al. | |
| 9,933,624 B1 | 4/2018 | White et al. | |
| 2006/0250322 A1 | 11/2006 | Hall et al. | |
| 2008/0188318 A1 | 8/2008 | Piccionelli et al. | |
| 2010/0131865 A1 | 5/2010 | Ackley et al. | |
| 2011/0141246 A1 | 6/2011 | Schwartz et al. | |
| 2011/0242134 A1 | 10/2011 | Miller et al. | |
| 2012/0320100 A1 | 12/2012 | Machida et al. | |
| 2013/0137076 A1 | 5/2013 | Perez et al. | |
| 2013/0141419 A1 | 6/2013 | Mount et al. | |
| 2014/0118829 A1 | 5/2014 | Ma et al. | |
| 2014/0146394 A1 | 5/2014 | Tout et al. | |
| 2014/0364208 A1 | 12/2014 | Perry | |
| 2014/0364209 A1 | 12/2014 | Perry | |
| 2014/0364212 A1 | 12/2014 | Osman et al. | |
| 2015/0003819 A1 | 1/2015 | Ackerman et al. | |
| 2015/0090242 A1 | 4/2015 | Weston et al. | |
| 2015/0097863 A1 | 4/2015 | Alaniz et al. | |
| 2015/0100179 A1 | 4/2015 | Alaniz et al. | |
| 2015/0103152 A1 | 4/2015 | Qin | |
| 2015/0190726 A1 | 7/2015 | Frolov | |
| 2015/0312561 A1 | 10/2015 | Hoof et al. | |
| 2015/0363976 A1 | 12/2015 | Henson | |
| 2016/0048203 A1 | 2/2016 | Blum et al. | |
| 2016/0062454 A1 | 3/2016 | Wang et al. | |
| 2016/0089610 A1 | 3/2016 | Boyle et al. | |
| 2016/0097929 A1 | 4/2016 | Yee et al. | |
| 2016/0097930 A1 | 4/2016 | Robbins et al. | |
| 2016/0098095 A1 | 4/2016 | Gonzalez-Banos et al. | |

(56) References Cited

U.S. PATENT DOCUMENTS

| | | |
|---|---|---|
| 2016/0171779 A1 | 6/2016 | Bar-Zeev et al. |
| 2016/0188943 A1 | 6/2016 | Franz |
| 2016/0196694 A1 | 7/2016 | Lindeman |
| 2016/0210784 A1 | 7/2016 | Ramsby et al. |
| 2016/0240013 A1 | 8/2016 | Spitzer |
| 2016/0346704 A1 | 12/2016 | Wagner |
| 2016/0353089 A1 | 12/2016 | Gallup et al. |
| 2016/0364907 A1 | 12/2016 | Schoenberg |
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0053445 A1 | 2/2017 | Chen et al. |
| 2017/0053446 A1 | 2/2017 | Chen et al. |
| 2017/0053447 A1 | 2/2017 | Chen et al. |
| 2017/0059831 A1 | 3/2017 | Hua et al. |
| 2017/0116950 A1 | 4/2017 | Onal |
| 2017/0131581 A1 | 5/2017 | Pletenetskyy |
| 2017/0171538 A1 | 6/2017 | Bell et al. |
| 2017/0176747 A1 | 6/2017 | Vallius et al. |
| 2017/0178408 A1 | 6/2017 | Bavor, Jr. et al. |
| 2017/0193679 A1 | 7/2017 | Wu et al. |
| 2017/0208318 A1 | 7/2017 | Passmore et al. |
| 2017/0212717 A1 | 7/2017 | Zhang |
| 2017/0220134 A1 | 8/2017 | Burns |
| 2017/0221264 A1 | 8/2017 | Perry |
| 2017/0236332 A1 | 8/2017 | Kipman et al. |
| 2017/0242249 A1 | 8/2017 | Wall et al. |
| 2017/0255011 A1 | 9/2017 | Son et al. |
| 2017/0262046 A1 | 9/2017 | Clement et al. |
| 2017/0262047 A1 | 9/2017 | Saito |
| 2017/0270841 A1 | 9/2017 | An et al. |
| 2017/0277256 A1 | 9/2017 | Burns et al. |
| 2017/0285344 A1 | 10/2017 | Benko et al. |
| 2017/0293144 A1 | 10/2017 | Cakmakci et al. |
| 2017/0316607 A1 | 11/2017 | Khalid |
| 2017/0323416 A1 | 11/2017 | Finnila |
| 2017/0323482 A1 | 11/2017 | Coup et al. |
| 2017/0336863 A1 | 11/2017 | Tilton et al. |
| 2017/0337737 A1 | 11/2017 | Edwards et al. |
| 2017/0345198 A1 | 11/2017 | Magpuri et al. |
| 2017/0363872 A1 | 12/2017 | Border et al. |
| 2017/0363949 A1 | 12/2017 | Valente et al. |
| 2017/0364145 A1 | 12/2017 | Blum et al. |
| 2018/0003962 A1 | 1/2018 | Urey et al. |
| 2018/0018515 A1 | 1/2018 | Spizhevoy et al. |
| 2018/0024370 A1 | 1/2018 | Carollo et al. |
| 2018/0032101 A1 | 2/2018 | Jiang |
| 2018/0033199 A9 | 2/2018 | Eatedali et al. |
| 2018/0059715 A1 | 3/2018 | Chen et al. |
| 2018/0059776 A1 | 3/2018 | Jiang et al. |
| 2018/0095498 A1 | 4/2018 | Raffle et al. |
| 2018/0104601 A1 | 4/2018 | Wagner |
| 2018/0164594 A1 | 6/2018 | Lee et al. |
| 2018/0196262 A1 | 7/2018 | Cage |
| 2018/0203240 A1 | 7/2018 | Jones et al. |

FOREIGN PATENT DOCUMENTS

| | | |
|---|---|---|
| FR | 2911463 A1 | 7/2008 |
| JP | 2012141461 A | 7/2012 |
| JP | 5790187 | 10/2015 |
| JP | 5801401 B2 | 10/2015 |
| JP | 2015228050 A | 12/2015 |
| JP | 5913346 B2 | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| WO | 1996031444 | 7/1998 |
| WO | 9851385 A1 | 11/1998 |
| WO | 2008059086 A1 | 5/2008 |
| WO | 2016023817 A2 | 2/2016 |

OTHER PUBLICATIONS

Jiejie Zhu et al: "Handling occlusions in video-based augmented reality using depth information", Computer Animation and Virtual Worlds, vol. 21, No. 5, pp. 509-521, XP055184802, Sep. 13, 2010.
Anonymous: "Head-up display—Wikipedia", XP055489840, retrieved from the Internet: URL:https://en.wikipedia.org/w/index.php?title=Head-up_display&oldid=766263622, pp. 2-3, Feb. 19, 2017.
Anonymous: "Head-mounted display—Wikipedia", XP055489914, retrieved from the Internet: URL:https://en.wikipedia.org/w/index.php?title=Head-mounted_display&oldid=767462464, pp. 1-3, Feb. 26, 2017.
Anonymous: "Augmented reality—Wikipedia", XP55488978, retrieved from the Internet: URL:https://en.wikipedia.org/w/index.php?title=Augmented_reality&oldid=768706789, pp. 3-4, Mar. 5, 2017.
PCT/US2018/021165 International Search Report and Written Opinion dated Jul. 24, 2018.

* cited by examiner

GAMEPLAY RIDE VEHICLE SYSTEMS AND METHODS

CROSS-REFERENCE TO RELATED APPLICATION

This application claims priority to and benefit of U.S. Provisional Patent Application No. 62/467,817, entitled "SYSTEMS AND METHODS FOR DIGITAL OVERLAY IN AN AMUSEMENT PARK ENVIRONMENT," filed Mar. 6, 2017, which is hereby incorporated by reference in its entirety for all purposes.

BACKGROUND

The subject matter disclosed herein relates to amusement park attractions, and more specifically, to providing interactive experiences in amusement park ride attractions.

Amusement parks or theme parks may include various entertainment attractions in providing enjoyment to guests of the amusement parks. For example, the attractions may include a ride attraction (e.g., closed-loop track, dark ride, thrill ride, or other similar ride). In such ride attractions, motion of a ride vehicle consists of programmed movements or the ride vehicle may include features (e.g., various buttons and knobs) that provide a passenger with varying levels of control over the ride vehicle. It is now recognized that there is a need for an improved ride attraction that provides enhanced passenger control over the ride vehicle to create a more interactive ride experience.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a ride system for an amusement park includes a ride vehicle configured to accommodate a rider and configured to travel along a ride path, a head mounted display configured to be worn by the rider, and a control system. The control system is configured to display a virtual instruction to the rider via the head mounted display, receive a signal from a user input device associated with the rider, determine that the signal received from the user input device corresponds to the virtual instruction, and trigger a movement of the ride vehicle in response to determining that the signal corresponds to the virtual instruction.

In an embodiment, a method of providing entertainment in an amusement park includes generating, via a computer graphics generation system of a control system communicatively coupled to a ride vehicle, a gaming environment, wherein the gaming environment includes a plurality of augmented reality (AR) objects, wherein the ride vehicle is configured carry one or more riders and to travel along a ride path, displaying the gaming environment via one or more head mounted displays associated with each of the one or more riders, receiving, via the control system, one or more signals from one or more user input devices associated with each of the one or more riders, and triggering, via the control system, movement of the ride vehicle based at least in part on the signals received from the one or more user input devices associated with each of the one or more riders, wherein the one or more user input devices include at least one steering device and at least one marking device.

In an embodiment, a ride and game control system integrated with a ride vehicle configured to carry a rider along a ride track, the ride and game control system includes a game controller configured to receive first input signals from a steering user input device associated with the ride vehicle, receive second input signals from at least one marking user input device associated with the ride vehicle, determine that the first input signals correspond to a virtual instruction, output, in response to determining that the first input signals correspond to the virtual instruction, a first control signal indicative of an instruction to cause a first movement of the ride vehicle, determine that the second input signals correspond to an interaction with an augmented reality (AR) object, and output, in response to determining that the second input signals correspond to the interaction with the AR object, a second control signal indicative of an instruction to cause a second movement of the ride vehicle. The ride and game control system also includes a ride controller communicatively coupled to the game controller and configured to receive the first control signal and the second control signal, and configured to control movement of the ride vehicle based at least in part on the first control signal and the second control signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an enhanced experience for riders of a ride attraction, such as passengers on a closed-loop track, dark ride, or other similar ride. A ride and game control system associated with a ride vehicle of the ride attraction may provide an augmented reality (AR) environment by way of head mounted displays worn by the riders, or other suitable displays. The AR environment may be combined with other off-board displays and effects to create an overall ride environment. The AR environment may be presented as, or part of, a game or gameplay environment that the riders may interact with throughout the ride. To provide a more interactive ride experience and to provide varied ride experiences between subsequent visits, the ride and game control system may provide divided (e.g., bifurcated) control over movement of the ride vehicle by the riders. That is, movement of the ride vehicle along and about a track (e.g., path) of the ride attraction may be controlled based at least in part on direct input from one or more user input devices, such as steering of the ride vehicle via a steering wheel user input device and/or changing a speed of the ride vehicle by depressing one or more pedals (e.g., accelerator pedal, brake pedal). Movement of the ride vehicle may also be controlled by the ride and game control system based at least in part on performance of the riders' interaction with the AR environment (e.g., as part of a game). For example, driving instructions may be presented via the AR environment to the rider steering the ride vehicle, and following or not following the driving instructions may cause different resulting movements of the ride vehicle. As another example, interactions by the riders with objects in the AR environment via the user input devices, such as releasing (e.g., shooting, throwing, or ejecting) an AR projectile (e.g., shell, ball, or other item) to mark or collide with a target object, may cause certain movements of the ride vehicle. Therefore, movement of the ride vehicle may be controlled at some times by a driver, at some times by the other riders, or at some times by both the driver and the other riders. The ride vehicle may enable the driver to drive the ride vehicle using the steering wheel user input device at certain times, and then the ride vehicle may override the driver control or supplement the driver control based on the driver's performance (e.g., following instructions) and/or based on the rider's performance (e.g., marking objects of the AR environment with AR projectiles) at other times to affect movement of the ride vehicle. Furthermore, the driver may retain steering control of the ride vehicle throughout some or all of the ride, but the speed of the ride vehicle may change based on the driver's performance and/or based on rider's performance during at least some portions of the ride. Control of the movement of the ride vehicle by the riders and the division of such control may provide a more interactive and varied ride experience. Additionally, in an embodiment, the ride and game control system may provide varied ride experiences via a weighting process based on a score or assessed skill level of the riders of the ride vehicle based on their driving and/or interaction with the objects of the AR environment.

Figure 1:
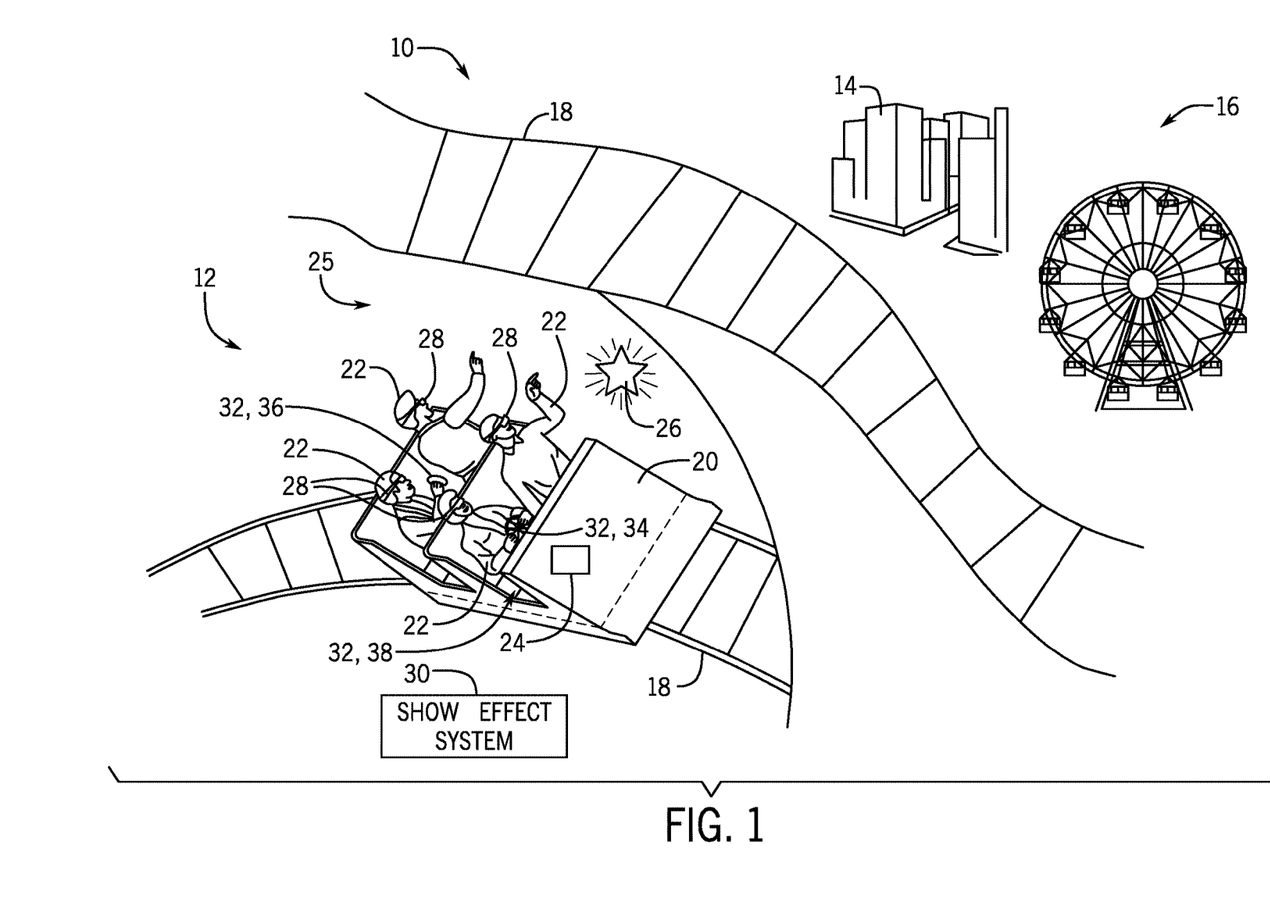
FIG. 1 is a schematic diagram of an embodiment of an amusement park including a ride attraction having a ride and game control system, in accordance with present embodiments.

With the foregoing in mind, FIG. 1 illustrates a schematic diagram of an amusement park 10 including a ride attraction 12. As illustrated, the amusement park may also include themed attractions 14 (e.g., fixed equipment, building layouts, props, decorations, and so forth corresponding to the theme) and other amusement park attractions 16 (e.g., Ferris wheel or other attractions). The ride attraction 12 may include a track or path 18 (e.g., a closed-loop track or a system of closed loop tracks) that may provide an infrastructure along which a ride vehicle 20 may travel. The ride attraction 12 may include a ride vehicle 20 that may accommodate and carry one or more riders 22 through the ride attraction 12. While the ride vehicle 20 is shown as accommodating four riders 22, the ride vehicle(s) 20 may each accommodate any number of riders (e.g., 1, 2, 3, 5, 6, or more). It should also be appreciated that while the ride attraction 12 may be illustrated as having one ride vehicle 20, the ride attraction 12 may include any number of ride vehicles 20 (e.g., 1, 2, 4, 8, 10, or more).

The track 18 may be a simple track or a controlled path, in which the movement of the ride vehicle 20 may be limited or controlled via an electronic system, a magnetic system, or other similar system. As the ride vehicle 20 moves along the track 18, the track 18 may define linear movement of the ride vehicle 20. The movement of the ride vehicle 20 may be controlled by a control system (e.g., a ride and game control system 24) of the ride vehicle 20, which may include multiple control systems. As well as causing linear movement of the ride vehicle 20 along the track 18, the ride and game control system 24 may cause other motion of the ride vehicle 20, such as rotating, rocking, spinning, vibrating, pivoting, and other similar motions. Additionally, the ride and game control system 24 may provide an augmented reality (AR) environment 25 of AR graphics including AR objects 26 presented to the riders 22 via head mounted displays 28 worn by the riders 22 throughout the duration of the ride attraction 12. The ride and game control system 24 may further coordinate presentation of the AR objects 26 via the head mounted displays 28 and/or the movement of the ride vehicle 20 with other off-board effects, such as visual and/or sound presentations, provided by way of a show effect system 30 that may include a projection game computer, display devices (e.g., projection display devices, digital display devices), lighting systems, and sound effect devices (e.g., speakers) disposed along the tracks 18.

In operation, the ride attraction 12 may be presented as a game or gameplay interaction between the riders 22 of the ride vehicle 20, the AR environment 25 (e.g., gaming environment), including the AR objects 26, and/or one or more other ride vehicles 20 of the ride attraction 12. The AR objects 26 may include objects, characters, and instructions to the riders. In some embodiments, the game of the ride attraction 12 may be presented as a race between the ride vehicles 20 and/or between characters presented via the AR environment 25. As the ride vehicle 20 moves along the track 18, one rider 22 may control certain direct movements of the ride vehicle 20, such as steering and turning the ride vehicle 20, via a user input device 32. The user input device 32 may be communicatively coupled to the ride and game control system 24, which may cause movement of the ride vehicle 20 based at least in part on signals received from the user input device 32. Various AR objects 26 (including AR instructions) may be presented to the riders 22 throughout the duration of the ride attraction 12 via the ride and game control system 24 and the head mounted displays 28. Each rider may have control of more than one user input device 32, and the user input devices 32 may include a steering user input device 34, a marking user input device 36, or other user input devices 38, such as an accelerator user input device. The riders 22 may interact with the AR objects 26 presented via the head mounted displays 28, such as following instructions presented via the AR objects 26 or interacting with the AR objects 26 via the marking user input devices 36 (e.g., marking the AR objects 26 with AR projectiles). Such interaction with the AR environment 25 by the riders 22 may also trigger or affect movement of the ride vehicle 20 caused by the ride and game control system 24. As such, the ride and game control system 24 may provide divided control of the movement of the ride vehicle 20 triggered by direct user input from the riders 22 (e.g., steering wheel) and by virtual interaction of the riders 22 with the AR environment 25 (e.g., game environment), as discussed in greater detail with reference to FIGS. 2, 4, and 5. Thus, the ride and game control system 24 allows the riders 22 to directly and indirectly change the movement of their respective ride vehicle 22 to provide a more interactive ride experience that may vary during subsequent rides of the ride attraction 12.

Additionally, the ride vehicle 20 may include multiple user input devices 32, such that each rider 22 is provided with one or more user input devices 32. For example, each rider 22 may be provided with a user input device 32 used to drive the ride vehicle 20, such as the steering user input device 34 and/or the other user input devices (e.g., an accelerator user input device) and a separate user input device 32 used to interact with the AR objects 26, such as the marking user input device 36 that may be used to simulate marking the AR object 26 with AR projectiles or a user input device used to simulate grabbing AR reward objects. The ride and game control system 24 may activate and deactivate control of the user input devices 32 throughout the duration of the ride attraction 12. As such, each rider 22 may have a chance to operate different user input devices 32 to interact with the ride attraction 12 and the AR environment 25 during each operation of the ride attraction 12. Further, the ride and game control system 24 may rotate control of certain user input devices 32 between the riders 22 in the ride vehicle 20. For example, each rider 22 may be provided with the steering user input device 34 and the marking user input device 36. The ride and game control system 24 may activate the steering user input device 34 for one rider 22, while activating the marking user input devices 36 for the other riders 22 within the ride vehicle 20. After a predetermined amount of time, a length of track, a number of interactions, or other metric, the ride and game control system 24 may rotate the steering control to another rider 22, thereby deactivating the steering user input device 34 from the previous driving rider 22 and activating the marking user input device 36 for the previous driving rider 22. Such rotation of control of the types of user input devices 32 throughout the duration of the ride attraction 12 may further provide a more interactive ride experience that may vary during subsequent rides of the ride attraction 12.

Figure 2:
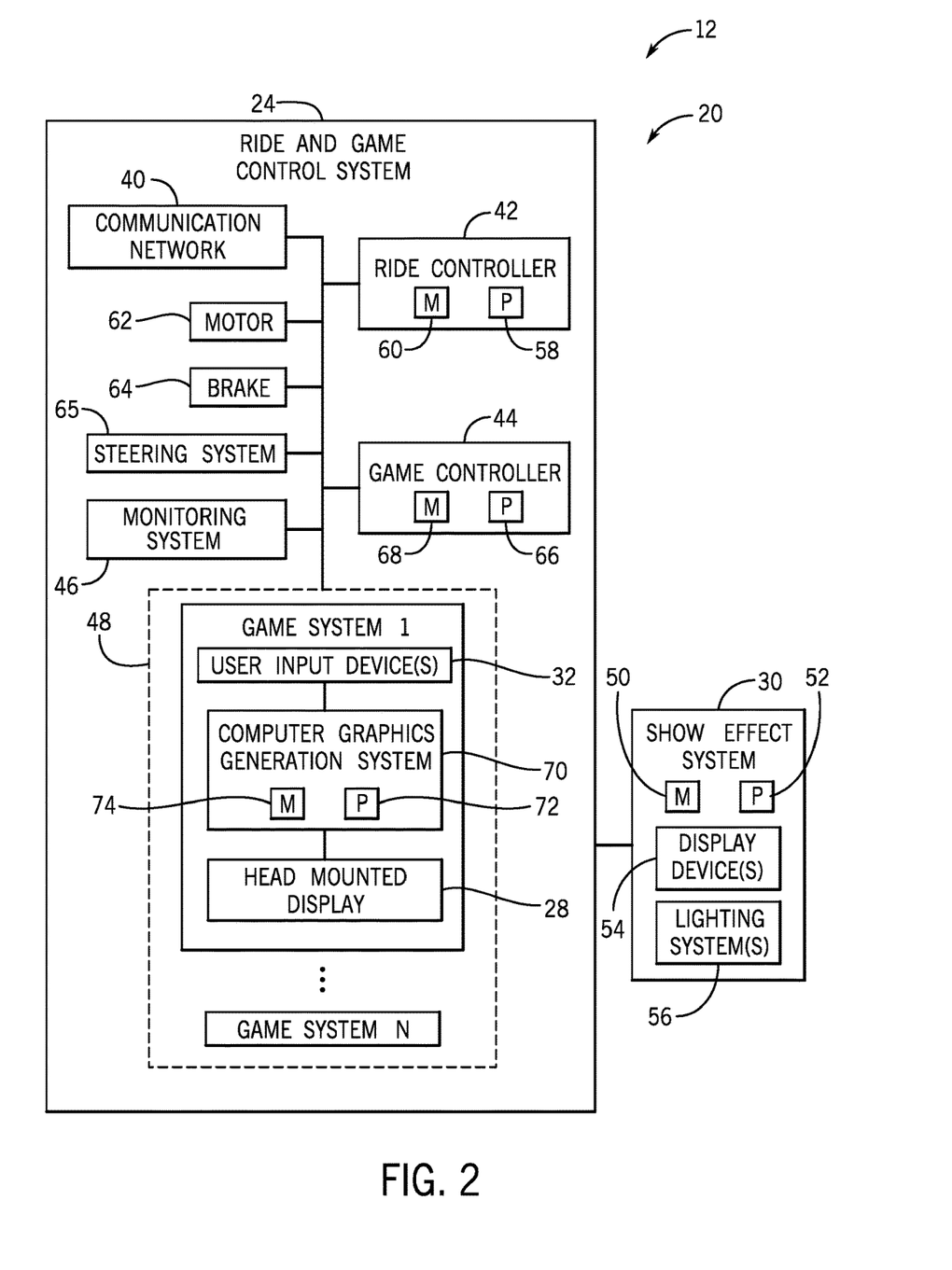
FIG. 2 is a block diagram of an embodiment of the ride and game control system that may be utilized within the ride attraction of FIG. 1, in accordance with present embodiments.

As previously discussed, the ride and game control system 24 may provide divided control of the movement of the ride vehicle 20 to the riders 22 based at least in part on input signals received from the user input device(s) 32 related to steering of the ride vehicle 20, as well as based at least in part on the interactions of the riders 22 with the AR environment 25, which may be presented as a gameplay setting. FIG. 2 is a block diagram illustrating various components of the ride and game control system 24. The ride and game control system 24 may be a dedicated system disposed on or integrated with the ride vehicle 20. The ride and game control system 20 may include a communication network 40 (e.g., wired and/or wireless communication network, such as wireless local area networks [WLAN], wireless wide area networks [WWAN], and near field communication [NFC]), a ride controller 42, a game controller 44, a monitoring system 46, and one or more game systems 48. The communication network 40 may communicatively couple the ride and game control system 24 to the show effect system 30 and/or other systems of the ride attraction system. The show effects system 30 may include a memory 50 and a processor 52, a projection game computer, one or more display devices 54, one or more lighting systems 56, and other devices (e.g., sound systems, speakers) disposed along the tracks 18. The communication network 40 may also communicatively couple the various on-board components of the ride vehicle 22 and the ride and game control system 24 (e.g., the ride controller 42, the game controller 44, the monitoring system 46, the one or more game systems 48, the head mounted displays 28) to one another, as shown in the illustrated embodiment.

The ride controller 42 of the ride and game control system 24 may be a programmable logic controller (PLC), or other suitable control device. The ride controller 42 may include a processor 58 (e.g., a general-purpose processor, a system-on-chip (SoC) device, an application-specific integrated circuit (ASIC), or some other similar processor configuration) operatively coupled to a memory 60 (e.g., a tangible non-transitory computer-readable medium and/or other storage device) to execute instructions for tracking operational parameters of the ride vehicle 20 and instructions for causing movement of the ride vehicle 20. As such, the ride controller 42 may be configured to track operational parameters of the ride vehicle 20 including, but not limited to, position, yaw, pitch, roll, and velocity of the ride vehicle 20, and input control state (e.g., input provided by one or more of the riders 22 to steer and/or drive the ride vehicle 20). Additionally, the ride controller 42 may be configured to control or change physical operation of the ride vehicle 22 based on the input signals received from the user input devices 32 and/or the game controller 44 (e.g., to change the position, yaw, pitch roll, and the velocity of the ride vehicle 22). Based at least in part on the input signals received from the user input devices 32 and/or the game controller 44, the ride controller 42 may output one or more control signals to a motor 62, or a brake 64, and/or a steering system 65 of the ride vehicle 20 indicative of an instruction to perform the input movement, such as turn the ride vehicle 20, change the speed of the ride vehicle 20, rotate the ride vehicle 20, or other suitable movement.

The game controller 44 of the ride and game control system 24 may be a programmable logic controller (PLC), or other suitable control device. The game controller 44 may include a processor 66 (e.g., a general-purpose processor, a system-on-chip (SoC) device, an application-specific integrated circuit (ASIC), or some other similar processor configuration) operatively coupled to a memory 68 (e.g., a tangible non-transitory computer-readable medium and/or other storage device) to execute instructions stored in the memory 68. The game controller 44 may be configured to provide operational parameters or information relating to the ride vehicle 22 to the one or more game systems 48 and/or the ride controller 42. The operational parameters or information may include, but is not limited to position, yaw, pitch roll, and the velocity of the ride vehicle 22. Additionally, the game controller 44 may be configured to determine and output signals to the one or more game systems 48 and/or the ride controller 42 indicative of how input signals received from the user input devices 32 should affect the movement of the ride vehicle 20. Thus, the game controller 44 may output instruction signals to the ride controller 42 indicative of particular movements associated with the input signals received via the user input devices 32 (e.g., the steering user input device 34, the marking user input device(s) 36, and the other user input device 38). The game controller 44 may also coordinate the movement instructions output to the ride controller with control signals and parameters output to the one or more game systems 48 indicative of how the ride vehicle 20 will move in order to coordinate the AR environment 25 presented to the riders 22 via the head mounted displays 28 with the movement of the ride vehicle 20.

The monitoring system 46 may include any suitable sensors and/or computing systems disposed on or integrated with the ride vehicle 20 to track the positions, locations, orientations, presences, and so forth of the riders 22 and/or the position, location, or orientation of the ride vehicle 20. Such sensors may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), presence sensors, and others. The information obtained by the monitoring system 46 may be provided to the game controller 44, the one or more game systems 48, and/or the ride controller 42 for determining each rider's gaze direction, viewing perspective, field of view, interaction with the game, and so forth. In an embodiment, the monitoring system 46 may also receive data obtained by the head mounted display 32 indicative of the respective rider's gaze direction, viewing perspective, field of view, interaction with the game, and so forth (e.g., position and orientation data of the head mounted display 32).

The one or more game systems 48 may be central processing units (CPUs) or other suitable system, and may generally be configured to render virtual or augmented graphics for overlay onto real-world environmental views. As such, the one or more game systems 48 may generate the AR environment 25 with which the riders 22 may interact in the gameplay setting. The one or more game systems 48 may also be responsible for game logic, and to run simulations of real world ride vehicles and stage geometry for the placement of virtual objects in real space. In certain embodiments, the one or more game systems 48 are configured to provide AR and/or game play experiences to the riders 22 via the head mounted displays 32. In particular, each seat or position of the ride vehicle 20 may include a dedicated game system 48. In an embodiment, the one or more game systems 48 may be communicatively coupled to one another, such that the passengers may engage in a shared game (e.g., a game having multiple players). The one or more game systems 48 may be communicatively coupled (directly or indirectly) to the ride controller 42, the game controller 44, the monitoring system 46, and the show effect system 34. Each of the one or more game systems 48 may include the user input device 32 or a group of multiple user input devices 32 and a computer graphics generation system 70. The user input device 32 may be communicatively coupled to the computer graphics generation system 70, and the computer graphics generation system 70 may be communicatively coupled to the respective head mounted display 32 (e.g., via the communication network 40).

The user input device(s) 32 may include one or more user input devices (e.g., handheld controllers, joysticks, push buttons) disposed on the ride vehicle 20 to enable the respective rider 22 to provide inputs to the ride controller 42, the game controller 44, and or the one or more game systems 48 for gameplay and to control movement of the ride vehicle 20, such as to change the velocity and/or direction of travel of the ride vehicle 20. For example, as previously discussed, the steering user input device 34 may include a steering wheel or other device to allow the rider 22 to steer the ride vehicle 20. The user input device(s) 32 may also include the marking device user input device 36 to allow the rider 22 to interact with the AR objects 26 of the AR environment 25. The user input device 32 may include any other type of input devices configured to allow the riders 22 to interact with the AR environment (e.g., game environment) and/or to directly control operation of the ride vehicle 20, such as the accelerator user input device. Additionally, the user input device(s) 32 may be configured to allow different actions and/or effects to be applied in the AR environment 25. For example, the user input device(s) 32 may allow the riders 22 to control the AR objects 26 (e.g., character, object) of the AR environment 25 in different directions (e.g., up, down, left, right). In an embodiment, the user input device(s) 32 may also include a display screen and/or a touch screen to enable ride and game related information to be communicated to the riders 22, such as information related to which user input device(s) 32 are currently activated for each rider 22 and/or gameplay instructions.

The computer graphics generation system 70 may generate and transmit AR graphics (e.g., the AR environment 25 including the AR objects 26) to be displayed on the respective head mounted display 28, such that the respective rider 22 may visualize the AR environment 25 (e.g., game environment). The computer graphics generation system 70 includes processing circuitry, such as a processor 72 (e.g., general purpose processor or other processor) and a memory 74, and may process data useful in generating the AR environment 25 for the respective rider 22. The data useful in generating the AR environment 25 may include, but is not limited to, real-time data received from the respective head mounted display 28, the user input device(s) 32, and the game controller 44 (e.g., including data from the ride controller 42 and the monitoring system 46), and data stored in the memory 74.

The computer graphics generation system 70 may use such data to generate a frame of reference to register the AR environment 25 to the real-world environment of the ride attraction 12, for example to generated real-world images or to the actual physical environment. Specifically, in certain embodiments, using the frame of reference generated based on orientation data, position data, point of view data, motion tracking data, and so forth, the computer graphics generation system 70 may render a view of the AR environment 25 in a manner that is temporally and spatially commensurate with what the respective rider 22 would perceive if not wearing the head mounted display 28. The computer graphics generation system 52 may store a model of the ride attraction 12 that is built using spatial information of the real-word physical features of the ride attraction 12 including the themed environment (e.g., physical scenery of the ride attraction 12). The model may be used, together with other inputs, such as inputs from the ride controller 42, the game controller 44, the monitoring system 46 and/or the head mounted display 28, to locate the respective rider 22 and determine the rider's gaze direction and/or field of view. The model may be used to provide display signals to the head mounted display 28 that are dynamically updated as the rider 22 travels along the track 18.

For example, the computer graphics generation system 70 may selectively generate AR graphics (e.g., the AR objects 26, including instruction objects) of the AR environment 25 to reflect changes in the respective rider's orientation, position, gaze direction, field of view, motion, and so forth. The computer graphics generation system 70 may selectively generate the AR environment 25 based on data indicative of the position, a yaw, and a velocity, and/or other operational parameters of the ride vehicle 20 received from the monitoring system 46, the game controller 44, and/or the ride controller 42. The computer graphics generation system 70 may also selectively generate the AR graphics to reflect changes in inputs provided by the respective passenger using the user input device(s) 32. Furthermore, the computer graphics generation system 70 may generate the AR graphics based on simulated interactions that may cause the AR objects 26 to be affected according to certain predetermined or modeled responses stored by the computer graphics generation system 70 (e.g., in the memory 74). As an example, the predetermined or modeled responses may be implemented by a physics engine or similar module or as a part of the computer graphics generation system 70. In certain embodiments, the computer graphics generation system 70 may track the information or data set forth above corresponding to a plurality of riders 22 in a shared game, such that the riders 22 in the shared game may see the game effects applied by other riders 22 (e.g., players) in the shared game.

Additionally, the computer graphics generations system 70 may receive input signals from the ride controller 24 and/or the game controller 44 indicative of the movement of the ride vehicle 20, such that the computer graphics generation system 70 may generate the AR environment 25 based at least in part on how the ride vehicle 20 is moving along or about the track 18. That is, the game controller 44 may determine, based at least in part on the inputs received from the user input devices 32 (e.g., the steering user input device 34, the marking user input device 36, and the other user input devices 38) indicative of the interaction of the riders 22 with the AR environment 25 how the ride vehicle 20 should be moving in response to the inputs, and the game controller 44 may output signals to the computer generation system 70 indicative of how the ride vehicle 20 will be moving in response to the rider interaction with the AR environment 25. As such, the computer graphics generation system 70 may generate the AR environment 25 based at least in part on how the ride vehicle 20 is being caused to move by the riders 22. Further, the computer graphics generation system 70 may receive signals from the ride controller 42 indicative of certain direct user inputs received from the steering user input device 34, such as steering the ride vehicle 22, such that the computer graphics generation system 70 may further generate the AR environment 25 based at least in part on how the ride vehicle 20 is being caused to move by the riders 22.

Figure 3:
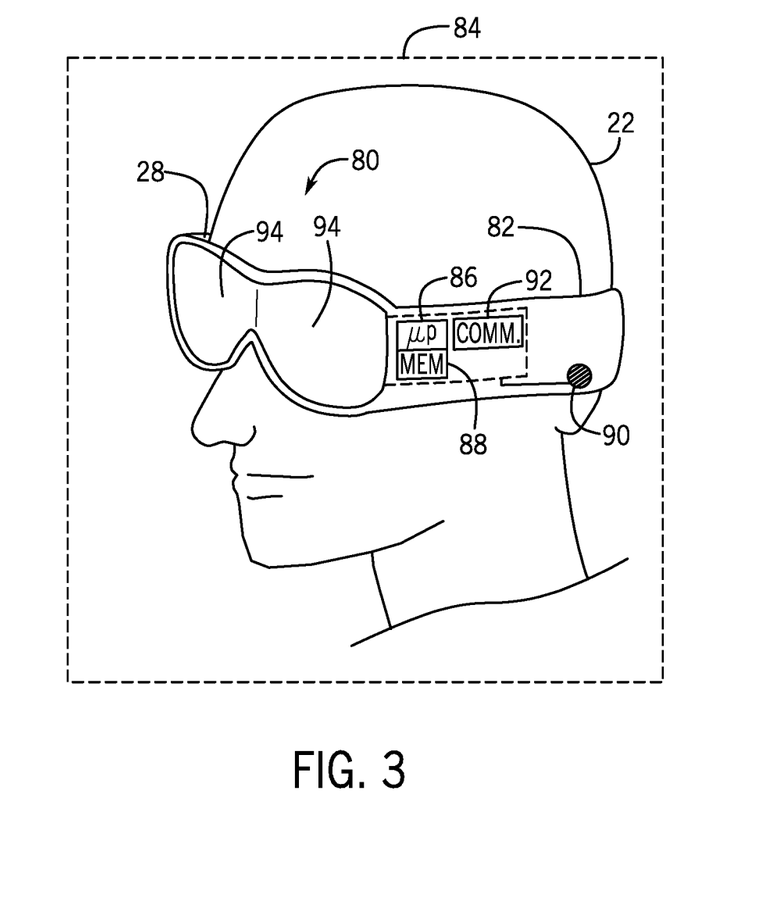
FIG. 3 is a perspective view of an embodiment of a head mounted display that may be utilized within the ride and game control system of FIG. 2, in accordance with present embodiments.

FIG. 3 is an illustration of an embodiment of the head mounted display 28 that may be worn by the riders 22 during the ride attraction 12. In an embodiment, the head mounted display 28 may be coupled to (e.g., tethered via a cable or a wire) the ride vehicle 20. In an embodiment, the riders 22 of the ride vehicle 20 may purchase or otherwise be provided the head mounted display 28. The head mounted display 28 may include electronic eyeglasses 80 (e.g., AR eyeglasses, goggles) and a wearable portion 82 configured to house at least a portion of the electronic eyeglasses 80. The head mounted display 28 may be used alone or in combination with other features to create a surreal environment 84 (e.g., including AR environment 25), which may include an AR experience or other similar surreal environment for the respective rider 22. Specifically, the head mounted display 28 may be worn by the rider 22 throughout the duration of the ride attraction 12.

The head mounted display 28 may include a processor 86 and a memory 88 (e.g., a tangible non-transitory computer-readable medium). The processor 86 and the memory 88 may be configured to allow the head mounted display 28 to function as a display (e.g., to receive signals from the computer graphics generation system 70 that ultimately drive the display). The processor 86 may be a general-purpose processor, system-on-chip (SoC) device, an application-specific integrated circuit (ASIC), or some other similar processor configuration.

The head mounted display 28 may include a tracking system 90 that may include orientation and/or position sensors, such as accelerometer, magnetometer, gyroscopes, GPS receiver, motion tracking sensor, electromagnetic and solid-state motion tracking sensor, IMU, presence sensor, and others. The tracking system 90 may collect real-time data indicative of the rider's position, orientation, focal length, gaze direction, field of view, motion, or any combination thereof. The head mounted display 28 may include a communication interface 92 (e.g., including a wireless transceiver) that may transmit the real-time data captured via the tracking system 90 to the processor 86 and/or the computer graphics generation system 70 for processing. The communication interface 92 may also allow the head mounted display 28 to receive the display signal transmitted by the computer graphics generation system 70.

The electronic eyeglasses 80 of the head mounted display 28 may include one or more displays 94. The one or more displays 94 may include a see-through display surface onto which images are projected, such as a see-through liquid crystal display (LCD), a see-through organic light emitting diode (OLED) display, or other similar display useful in displaying the real world and the AR graphical images to the rider 22. For example, the rider 22 may view the AR graphics appearing on the respective displays 94 as an overlay to the actual and physical real world environment. In accordance with the present embodiments, the head mounted display 28 may receive, via the communication interface 92, the display signal (e.g., AR graphics together with the respective overlay information, such as spatial and/or temporal information with respect to the one or more displays 94), such that the head mounted display 28 may process and overlay, via the processor 86, the AR graphics on the one or more displays 94 so that the rider 22 perceives that the AR graphics of the AR environment 25 are integrated into the real world environment. In an embodiment, the head mounted display 28 may include one or more sound devices (e.g., earphones, speakers, microphones).

Figure 4:
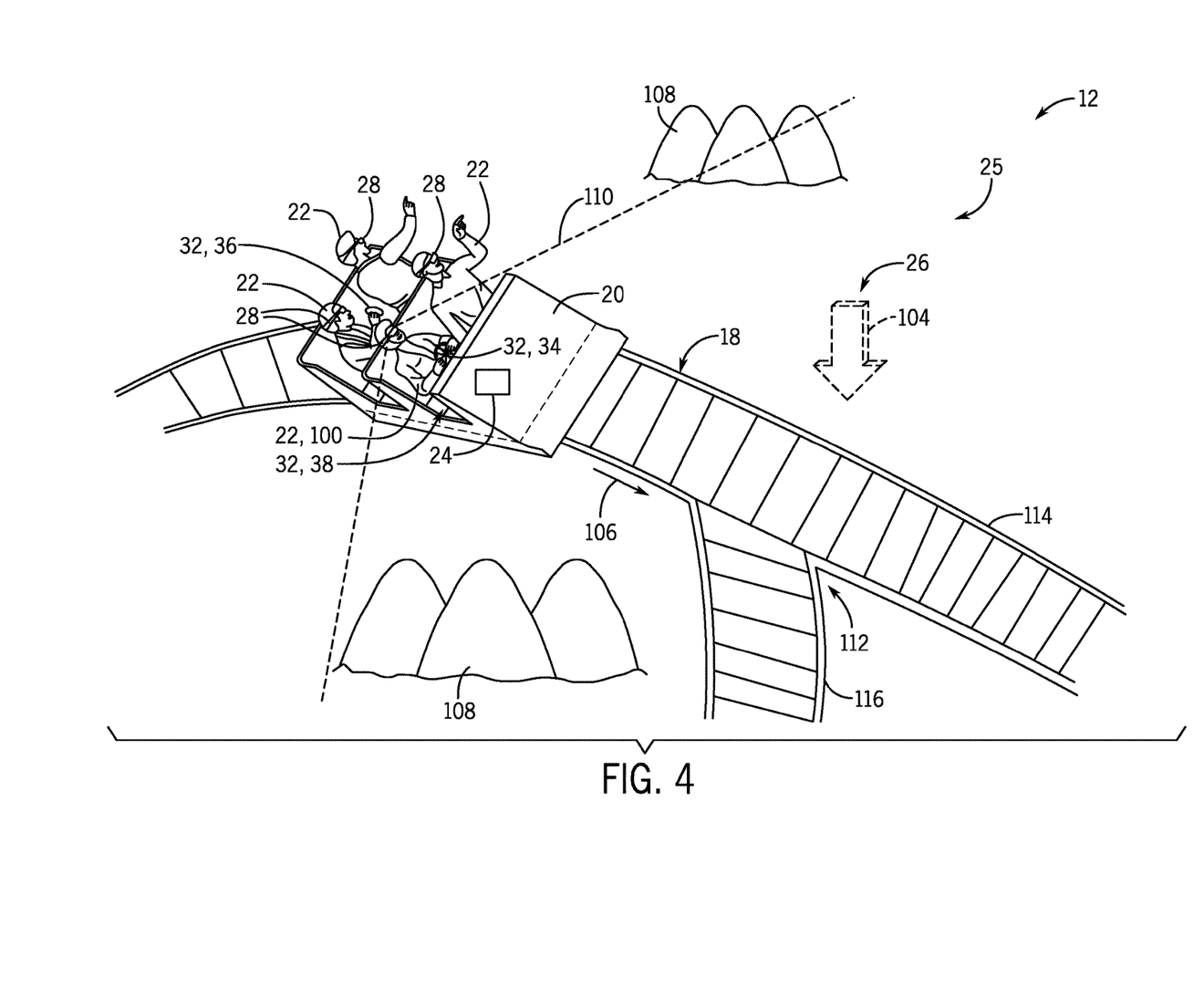
FIG. 4 is a schematic diagram illustrating an embodiment of driver control of a ride vehicle of the ride attraction of FIG. 1 and showing an example augmented reality (AR) instruction, in accordance with present embodiments.

To illustrate driver control of movement of the ride vehicle 20, FIG. 4 is a schematic diagram showing a driving rider 100 (e.g., the rider 22 having control of an activated steering user input device 34 used to steer the ride vehicle 20) steering the ride vehicle 20 via the steering user input device 34. As previously mentioned, the ride and game control system 24 of the ride vehicle 20 may allow divided control of movement of the ride vehicle 20 by the riders 22. As such, the driving rider 100 may affect movement of the ride vehicle 20 in two ways, via direct input of the movement of the ride vehicle 20, such as steering of the ride vehicle 20 using the steering user input device 34, as well as via indirect input, such as by following one or more AR instructions 104 presented to the driving rider 22. That is, the driving rider 100 may steer the ride vehicle 20 via the steering user input device 34. Additionally, the driving rider 100 may affect the velocity of the ride vehicle 20 via their driving performance in following the AR instructions 104 that are presented.

In the illustrated embodiment, the ride vehicle 20 is traveling along the track 18 in the direction 106. The riders 22 may be viewing the AR environment 25 (e.g., game environment) in combination with themed attractions 108 (e.g., real-world scenery of the ride attraction 12) via the head mounted displays 28. At certain points during the ride attraction 12, one rider 22 may be the driving rider 100. The driving rider 100 may be the rider 22 whose respective steering user input device 34 is currently activated. As previously discussed, the ride and game control system 24 may rotate control of the steering user input device 34 between the riders 22 throughout the duration of the ride attraction 12, such that each rider 22 of the ride vehicle 20 may have an opportunity to steer the ride vehicle 20. The steering user input device 34 may output signals to the ride and game control system 24 (e.g., to the ride controller 42, the game controller 44, and/or the respective game system 48) to directly control movement of the ride vehicle 20. While traveling along the track 18, the driving rider 100 may be presented with an AR object 26, or physical object, that is an instruction object 104 via the respective head mounted display 28. The instruction object 104 may present driving or game instructions to the driving rider 100, such as instructions to turn a certain direction, to increase or decrease speed, to follow a certain track at a track split, or to collide with or avoid certain AR objects 26 of the AR environment 25. The instruction object 104 indicating driving instructions may be presented only to the driving rider 100, or may be presented to all of the riders 22 of the ride vehicle 20. Additionally, while the instruction object 104 is shown as an arrow in the illustrated embodiment, the instruction object 104 may be text, a symbol, a graphic, a character, or any other object that may be used to indicate to the driving rider 100 a direction to steer or control the ride vehicle 20.

As an example, in the illustrated embodiment, the driving rider 100 controlling the steering user input device 34 is presented with the instruction object 104 via the respective head mounted display 28 combined with themed attractions 108 within their field-of-view 110. The instruction object 104, in the illustrated embodiment, is presented as an arrow indicating a turning direction to follow at an upcoming track split 112. The track 18 splits at the track split 112 such that the driver may continue on a current path by staying on a track 14 or may turn the ride vehicle 20 using the steering user input device 34 to follow a path 116 as indicated by the instruction object 104. If the driving rider 100 turns the ride vehicle 20 toward the track 116 using the steering user input device 34, the ride vehicle 20 may be controlled by the ride controller 42 and/or the game controller 44 of the ride and game control system 24 to turn in the direction of the track 116. As such, the driving rider 100 is able to directly control movement of the ride vehicle 20 via the steering user input device 34.

Additionally, the driving rider 100 may control movement of the ride vehicle 20 by following the instruction objects 104. As such, correctly following the indication of the presented instruction object 104 may cause additional movement of the ride vehicle 20 and/or may add to a score of the driving rider 100, or a score of the ride vehicle 20, which may cause additional movement of the ride vehicle 20 to be triggered by the ride and game control system 24. For example, in the illustrated embodiment, if the driving rider 100 follows the instruction object 104 by using the steering user input device 34 to turn the ride vehicle 20 toward the track 116, not only will the ride vehicle 20 be caused to turn toward the track 116 based at least in part on signals received from the steering user input device 34, but additional movement of the ride vehicle 20 may be triggered by correctly following the instruction object 104 and/or increasing the driving score. The movement triggered by following the instruction object 104 may include any movement additional to the direct movement initiated by input signals from the steering user input device 34, such as a change in velocity (e.g., from a first non-zero velocity to a second non-zero velocity) of the ride vehicle 20, start the ride vehicle 20, stop the ride vehicle 20, or other suitable movement. For example, the movement triggered by following the instruction object 104 may be to cause the ride vehicle 20 to move faster to provide a more exciting ride or to cause the ride vehicle 20 to move slower to allow the other riders 22 more time to interact with the AR objects 26, thereby allowing the other riders 22 and/or the ride vehicle 20 to collect more points. As such, the driving rider 100 is able to indirectly control movement of the ride vehicle 20 by following the presented instruction object 104. Additionally, following the instruction object 104 may cause the AR environment 25 to change, such that the other riders 22 may be presented with more AR objects 26.

In an embodiment, in addition to triggering movement of the ride vehicle 20 by following the instruction object 104 and/or increasing the score of the driving rider 100, or the score of the ride vehicle 20, the driving rider 100 may cause movement of the ride vehicle 20 by not following, or incorrectly following, the instruction object 104. Such movement may include spinning of the ride vehicle 20, a decrease in velocity of the ride vehicle 20, or other suitable movement. For example, in the illustrated embodiment, if the driving rider 100 does not follow the instruction object 104 (e.g., within a time period following display of the instruction and/or prior to the track split 112) indicating to steer the ride vehicle 20 toward the track 116, the ride and game control system 24 may cause the ride vehicle to spin and/or change velocity based at least in part on the missed instruction object 104. For example, the movement triggered by not following, or missing, the instruction object 104 may be to cause the ride vehicle 20 to move faster to make it more difficult for the other riders 22 to earn points or to move slower to make the game easier. As such, in an embodiment, the driving rider 100 is also able to indirectly cause movement of the ride vehicle 20 by not following the presented instruction object 104. Additionally, missing the instruction object 104 may cause the AR environment 25 to change, such that the other riders 22 may be presented with fewer or different AR objects 26. In an embodiment, a missed instruction object 104 may result in a decrease in the rider score or ride vehicle score, which may in turn trigger movement of the ride vehicle 20 as well.

In an embodiment, the game controller 44 and/or the respective game system 48 of the ride and game control system 24 may include a weighting system that may cause particular AR objects, including the instruction object 104, to be presented to each rider 22, or ride vehicle 20, corresponding to a skill level of the rider 22 or the ride vehicle 20 determined by the weighting system. The ride and game control system 24 may monitor driving and/or interactions with the AR environment 25, including the instruction object 104, of each rider 22 and/or ride vehicle 20 for a determined period of time at the beginning of the ride attraction 12. Based at least in part on the monitored driving and/or interactions with the AR environment 25, the ride and game control system 24 may determine a starting skill level of the rider 22 or the ride vehicle 20. A subsequent scene or predetermined interaction may be generated by the computer graphics generation system 70 and presented to the rider(s) 22 based on the determined skill level.

As such, each rider 22 or ride vehicle 20 may be presented with the AR environment 25, including the instruction objects 104, corresponding to the determined skill level, such that each rider 22 or ride vehicle 20 may be presented with different AR objects at the same interaction area along the ride attraction 12. The weighting system of the ride and game control system 24 may determine and update the skill level of the rider 22 and/or the ride vehicle 20 at each predetermined interaction area, thus allowing the AR environment 25 to correspond to the skill level of the rider 22 and/or all riders 22 of the ride vehicle 20, collectively, as the ride vehicle 20 travels through the ride attraction 12. Therefore, the instruction object 104 presented to the driving rider 100 may be based at least in part on the current determined skill level of the driving rider 100 and/or the current determined skill level of the riders 22 of the ride vehicle 20 as a whole. Additionally, the types of movements of the ride vehicle 20 triggered directly and indirectly by inputs received from the steering user input device 34 may be based at least in part on the current determined skill level of the driving rider 100 and/or the current determined skill level of the riders 22 of the ride vehicle 20 as a whole. For example, if the driving rider 100 is determined to have a relatively high skill level, the instruction object 104 may appear closer to the track split 112 and/or following the instruction correctly may cause the velocity of the ride vehicle 20 to change to a greater extent compared to lower skill levels.

Figure 5:
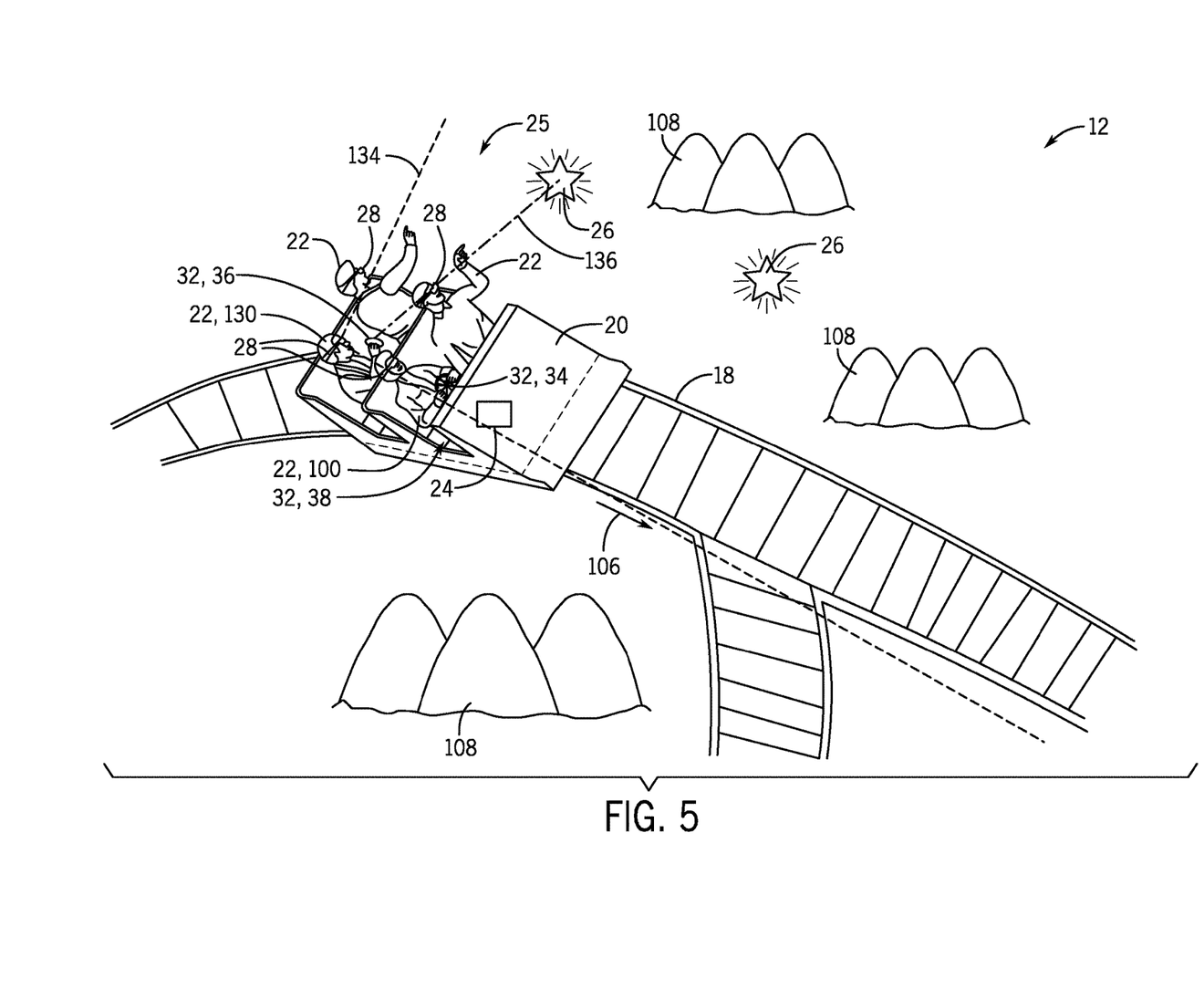
FIG. 5 is a schematic diagram illustrating an embodiment of rider control of the ride vehicle of the ride attraction of FIG. 1, in accordance with present embodiments.

Similarly, FIG. 5 is a schematic diagram showing a marking rider 130 having control of the marking user input device 36 used to interact with the AR objects 26 of the AR environment 25. Several riders 22 may be in control of marking user input devices 36 at a time, and as previously discussed, control of different types of the user input devices 32 may rotate between the riders 22 of the ride vehicle 20 throughout the duration of the ride attraction 12. As previously mentioned, the ride and game control system 24 of the ride vehicle 20 may allow divided control of movement of the ride vehicle 20 by the riders 22. As such, the marking rider 130 may affect movement of the ride vehicle 20 by interacting with the AR objects 26 of the AR environment 25 (e.g., game environment). While described as a marking user input device in the illustrated embodiment, the user input devices 32 other than the steering user input device 34 may be any other type of user input device 32 that may be used to interact with the AR environment 25, such as a device used to grab or move the AR objects 26 or other suitable user input device 32.

In the illustrated embodiment, the ride vehicle 20 is traveling along the track 18 in the direction 106. The riders 22 may be viewing the AR environment 25 in combination with themed attractions 108 (e.g., real-world scenery of the ride attraction 12) via the head mounted displays 28. While traveling along the track 18, the marking rider(s) 130 may be presented with AR objects 26, such as objects, rewards, and/or characters, within their field-of-view 134. The marking rider 130 may mark or otherwise interact with the AR objects with AR projectiles 136, as in the illustrated embodiment. Such interactions with the AR objects 26 of the AR environment 25 may indirectly affect or trigger movement of the ride vehicle 20 via the ride and game control system 24. Interactions with the AR objects 26 may also increase the rider score or ride vehicle score, which in turn may affect or trigger movement of the ride vehicle 20. For example, the marking rider 130 may mark the presented AR objects 26 with AR projectiles 136. If the marking rider 130 marks or hits the AR object 26, or wins a game with the AR object 26 (e.g., a character), the ride and game control system 24 may trigger certain movements of the ride vehicle 20, such as change the velocity of the ride vehicle 20, spin the ride vehicle 20, shake the ride vehicle 20 or components of the ride vehicle 20 (e.g., seats), or other suitable movement. Additionally, achieving certain rider scores or ride vehicle scores may also trigger such movements of the ride vehicle 20. The game controller 44 and/or the respective game system 48 may receive input signals from the marking user input device 36 and based at least in part on the signals received, may output control signals to the ride controller 42 to cause certain movement of the ride vehicle 20. As such, the marking rider(s) 130, or riders 22 not currently in control of the steering user input device 34, are able to indirectly control movement of the ride vehicle 20 by interacting with the presented AR objects 26.

As previously discussed, in an embodiment, the game controller 44 and/or the respective game system 48 of the ride and game control system 24 may include or act as a weighting system that may cause particular AR objects 26 to be presented to each rider 22, or ride vehicle 20, corresponding to a skill level of the rider 22 or the ride vehicle 20 determined by the weighting system. The ride and game control system 24 may monitor driving and/or interactions with the AR environment 25 of each rider 22 and/or ride vehicle 20 for a determined period of time at the beginning of the ride attraction 12. Based at least in part on the monitored driving and/or interactions with the AR environment 25, the ride and game control system 24 may determine a starting skill level of the rider 22 or the ride vehicle 20. A subsequent scene or predetermined interaction may be generated by the computer graphics generation system 70 and presented to the rider(s) 22 based on the determined skill level.

As such, each rider 22 or ride vehicle 20 may presented with the AR environment 25 corresponding to the determined skill level, such that each rider 22 or ride vehicle 20 may be presented with different AR objects 26 at the same interaction area along the ride attraction 12. The weighting system of the ride and game control system 24 may determine and update the skill level of the rider 22 and/or the ride vehicle 20 at each predetermined interaction area, thus allowing the AR environment 25 to correspond to the skill level of the rider 22 and/or all riders 22 of the ride vehicle 20, collectively, as the ride vehicle 20 travels through the ride attraction 12. Therefore, the AR objects 26 presented to the marking rider 130 may be based at least in part on the current determined skill level of the driving rider 100 and/or the current determined skill level of the riders 22 of the ride vehicle 20 as a whole. Additionally, the types of movements of the ride vehicle 20 triggered indirectly by inputs received from the marking user input device 36 may be based at least in part on the current determined skill level of the marking rider 130 and/or the current determined skill level of the riders 22 of the ride vehicle 20 as a whole. For example, if the marking rider 130 is determined to have a relatively high skill level, a difficulty level of the interaction may be relatively high, such as harder to hit AR objects 26, and hitting or marking the AR objects 26 may cause the velocity of the ride vehicle 20 to change to a greater degree compared to lower skill levels.

It should be understood that both FIG. 4 and FIG. 5 have been simplified to show the perspective of only one rider 22 at a time, and that all riders 22 of the ride vehicle 20 may be in control of one or more user input devices 32 at a time. The interaction of all of the riders 22 of the ride vehicle 20 with the AR objects 26 and driving performance, as discussed above, may affect and cause movement of the ride vehicle 20 via the ride and game control system 24.

Figure 6:
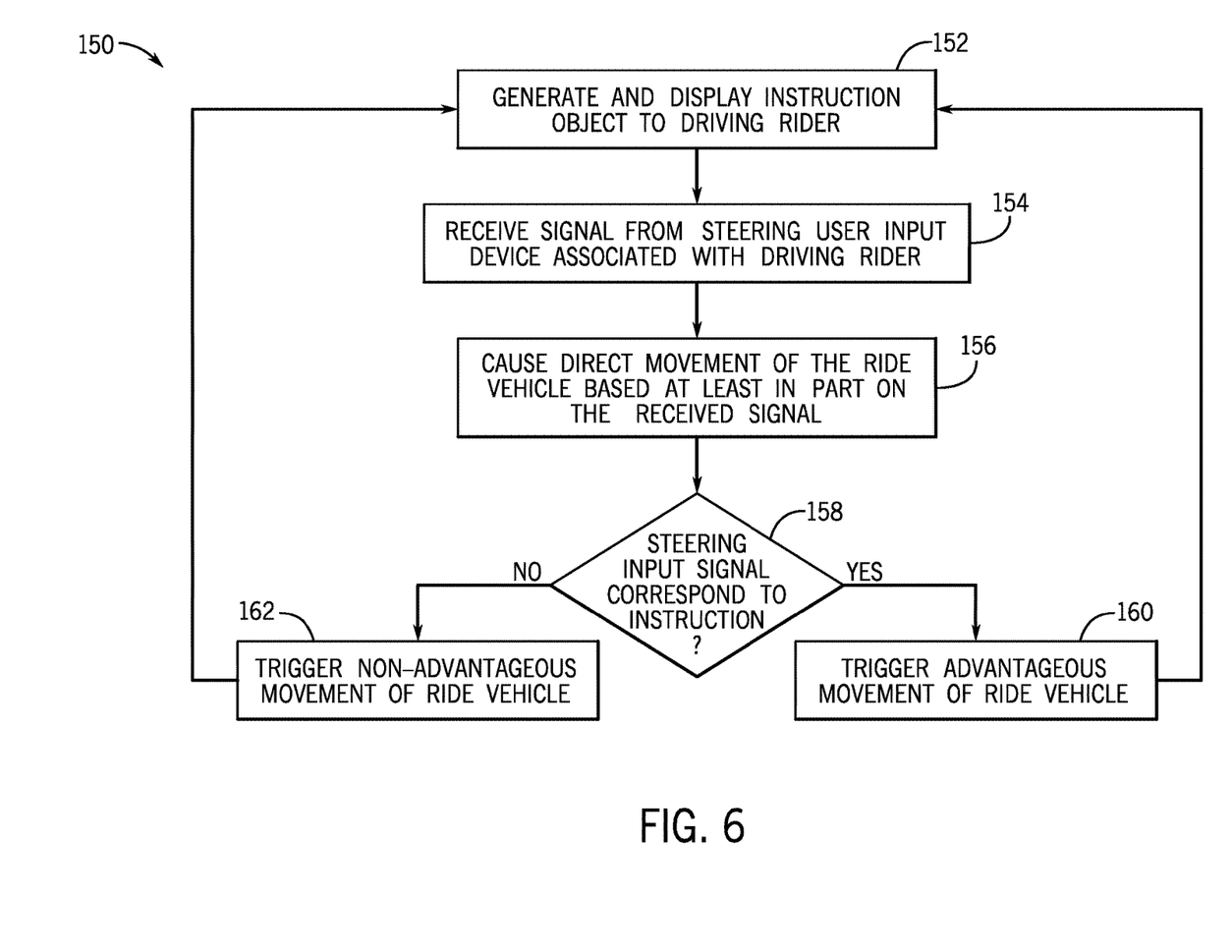
FIG. 6 is a flow diagram of an embodiment of a method for controlling movement of the ride vehicle using the ride and game control system of FIG. 2 based at least in part on performance of the driver of the ride vehicle, in accordance with present embodiments.

As previously discussed, movement of the ride vehicle 20 may be controlled by both the driving rider 100 and the other riders 22 (e.g., the marking riders 130). Steering of the ride vehicle 20 may be controlled by the driving rider 100 via the steering user input device, and additionally, in an embodiment, velocity of the ride vehicle 20 may be controlled by the driving rider 100 via the other user input devices 38, such as the accelerator user input device or brake user input device. Movement of the ride vehicle 20, such as steering and/or velocity of the ride vehicle 20, may also be controlled based on a performance of the driving rider 100 and/or the other riders 22 (e.g., the marking riders 130) relative to the AR environment 25 or game. With that in mind, FIG. 6 is a flow diagram of an embodiment of a method 150 for controlling or triggering movement of the ride vehicle 20 via the ride and game control system 24 based at least in part on direct and indirect movement inputs received by the driving rider 100. The method 150 may be continuously performed by the ride and game control system 24 as the ride vehicle 20 travels along the tracks 18 and as control of driving of the ride vehicle (e.g., control of the steering user input device 32 and/or the accelerator user input device) is transferred between the riders 22 throughout the duration of the ride attraction 12. The method 150 includes generation and display of the AR instruction object 104 to present driving instructions to the driving rider 100 (block 152). As previously discussed, the instruction object 34 may be text, a symbol, a graphic, a character, or any other object indicating to the driving rider 100 to steer or control the ride vehicle 20 in a particular manner. The instruction object 104 may also be an object on the track 18 to be avoided. The current driving rider 100 of the ride vehicle 20 may directly steer the ride vehicle 20 via the steering user input device 34 in response to the instruction object 104 generated and displayed to the driving rider 100 via the game controller 44 and/or the respective game system 48. Based on steering of the driving rider 100 via the steering user input device 34, signals are received by the ride controller 42 and/or the game controller 44 of the ride and game control system 24 that are indicative of the steering (block 154).

Next, the ride and game control system 24 may trigger direct movement of the ride vehicle 20 based at least in part on the received steering input received, such as turning the ride vehicle 20 in the direction of the steering input, via the ride controller 42 and/or the game controller 44 (block 156). Next, the ride and game control system 24 may determine, via the game controller 44 and/or the respective game system 48, whether the steering inputs received from the steering user input device 34 correspond to the indicated instruction presented to the driving rider 100 via the instruction object 104 (block 158). For example, whether the driver appropriately turned the steering wheel (e.g., steering user input device 34) and/or operated other inputs, such as the accelerator user input, within a time period following presentation of the instruction object 104. If the ride and game control system 24 determines that the received steering input corresponds to the instruction object 104, the ride and game control system 24 may trigger additional movement of the ride vehicle 20, such as a change in velocity of the ride vehicle 20 (block 160). Additionally or alternatively, movement of the ride vehicle 20 may be affected or triggered based at least in part on the rider score and/or ride vehicle score, such that movements are triggered when the rider score and/or ride vehicle score exceed a threshold score. In such embodiments, the rider score and/or ride vehicle score may be increased in response to the driver correctly following the instructions 104.

If the ride and game control system 24 determines that the received steering input does not correspond to the instruction object 104, the ride and game control system 24 may trigger different movement of the ride vehicle 20, such as a change in velocity of the ride vehicle 20 and/or spinning of the ride vehicle 20 (block 162). In an embodiment, movement may not be triggered if the ride and game control system 24 determines that the received steering input does not correspond to the presented instruction object 104. It should be understood that the method 150 may be an iterative or repeating process that is performed throughout the duration of the ride attraction 12 to trigger movement of the ride vehicle 20.

Figure 7:
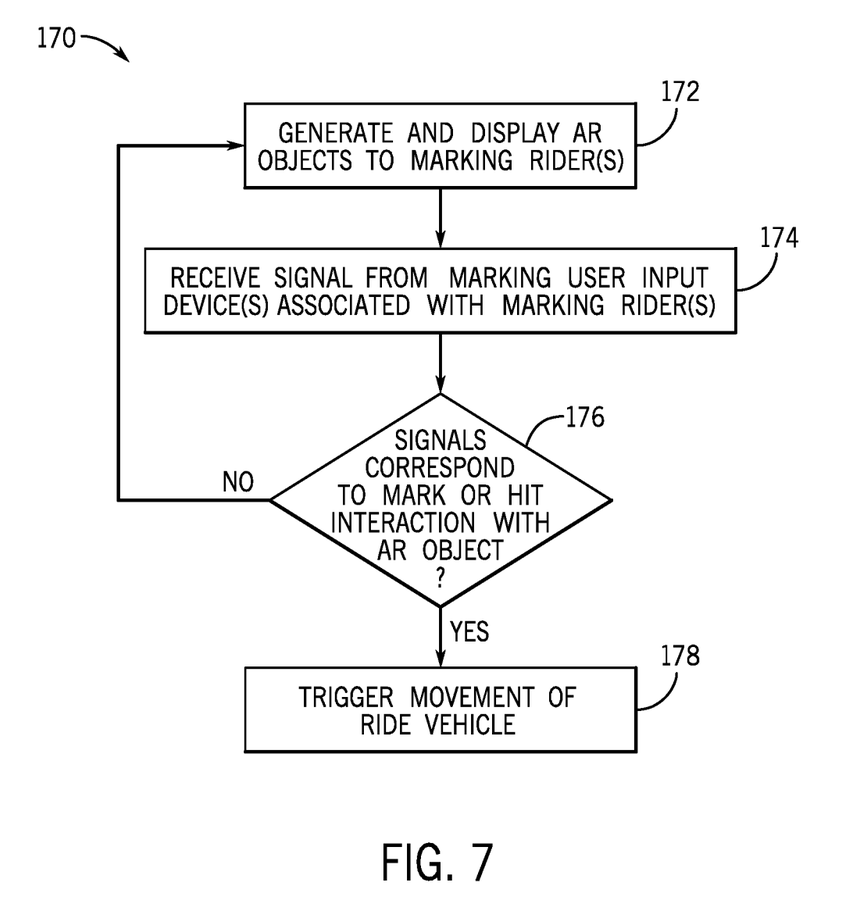
FIG. 7 is a flow diagram of an embodiment of a method for controlling movement of the ride vehicle using the ride and game control system of FIG. 2 based at least in part on performance of one or more riders of the ride vehicle, in accordance with present embodiments.

FIG. 7 is a flow diagram of an embodiment of a method 170 for controlling or triggering movement of the ride vehicle 20 via the ride and game control system 24 based at least in part on interactions of the marking rider(s) 130 with the AR environment 25. The method 170 may be continuously performed by the ride and game control system 24 as the ride vehicle 20 travels along the tracks 18 and as control of the marking user input device(s) 36 is transferred between the riders 22 throughout the duration of the ride attraction 12 or at certain times or portions of the ride attraction 12. The method 170 includes generation and display of the AR objects 26 of the AR environment 25 to the marking rider(s) 130 (block 172). The current marking rider(s) 130 may interact with the AR objects 26 (e.g., mark at the AR objects 26) via the marking user input device(s) 36. Based on the interaction of the current marking rider(s) 130 with the AR objects 26, signals indicative of the interaction are received by the game controller and/or the respective game system 48 of the ride and game control system 24 (block 174).

Next, the ride and game control system 24 may determine, via the game controller 44 and/or the respective game system 48, whether the received signals indicative of the interaction of the marking rider(s) 130 with the AR objects 26 correspond to hits of the AR objects 26 or a win of a simulated game (block 176). If the ride and game control system 24 determines that the interaction corresponds to marks or hits of the AR objects 26 or a win of a simulated game, the ride and game control system 24 may trigger movement of the ride vehicle 20, such as a change in velocity of the ride vehicle 20 (block 178). Additionally or alternatively, movement of the ride vehicle 20 based at least in part on the interaction of the marking rider(s) 130 with the AR environment 25 may be triggered based at least in part on the rider score and/or ride vehicle score, such that additional movements are triggered when the rider score and/or ride vehicle score exceed a threshold score. In such embodiments, the rider score and/or ride vehicle score may be increased based on hits or wins. If the ride and game control system 24 determines that the interaction does not correspond to marks or hits of the AR objects 26 or a win of a simulated game, the ride and game control system 24 may trigger movement of the ride vehicle 20, such as changing the velocity of the ride vehicle 20, or may not trigger additional movement of the ride vehicle 20.

It should be understood that the methods 150 and 170 may be performed independently or together throughout the duration of the ride attraction 12. Performance of the methods 150 and 170 may alternate or be at different portions of the ride attraction 12. Therefore, movement of the ride vehicle 20 may be controlled at some times by the driving rider 100, at some times by the other riders 22 (e.g., the marking riders 130), or at some times by both the driving rider 100 and the marking riders 130. Further, as each rider 22 may be in control of at least one user input device 32 at a time, the methods 150 and 170 may be continuously performed for each rider 22 and each user device throughout the duration of the ride attraction 12 to create divided control of the movement of the ride vehicle 20 by the riders 22 and their interaction with the AR environment 25 (e.g., the game environment).

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride system for an amusement park, comprising:
   a ride vehicle configured to accommodate a rider and configured to travel along a ride path;
   a head mounted display configured to be worn by the rider; and
   a control system configured to:
      display a virtual driving instruction to the rider via the head mounted display;
      receive a signal from a steering user input device associated with the rider;
      determine that the signal received from the steering user input device corresponds to the virtual driving instruction; and
      trigger a movement of the ride vehicle in response to determining that the signal corresponds to the virtual driving instruction.

2. The ride system of claim 1, wherein the virtual driving instruction comprises an augmented reality (AR) object.

3. The ride system of claim 1, comprising the steering user input device, wherein the steering user input device comprises a steering wheel, a handheld controller, a joystick, or a push button configured to be operated by the rider to steer the ride vehicle.

4. The ride system of claim 3, wherein the control system is configured to control a steering system to steer the ride vehicle in accordance with the signal received from the steering user input device and to trigger a change in speed of the ride vehicle in response to determining that the signal corresponds to the virtual driving instruction.

5. The ride system of claim 1, wherein the ride vehicle is configured to accommodate another rider, wherein the ride system comprises another head mounted display configured to be worn by the another rider, and wherein the control system is further configured to:
   display an augmented reality (AR) object to the another rider via the another head mounted display;
   receive a respective signal from a marking user input device associated with the another rider;
   determine that the signal received from the marking user input device corresponds to an interaction with the AR object by determining that the signal received from the marking user input device corresponds to a mark of the AR object with a virtual projectile from the marking user input device; and
   trigger, in response to determining that the signal received from the marking user input device corresponds to the interaction with the AR object, another movement of the ride vehicle.

6. The ride system of claim 5, wherein the control system is configured to determine a skill level of the another rider based on a weighting process of previous interactions of the another rider with a plurality of other AR objects throughout a portion of the ride prior to the interaction, wherein the AR object and the plurality of other AR objects are part of an AR environment visible to the another rider via the another head mounted display, and the control system is configured to adjust the AR environment based on the skill level of the another rider.

7. The ride system of claim 1, wherein the control system is configured to trigger another movement of the ride vehicle in response to determining that the signal does not correspond to the virtual driving instruction.

8. The ride system of claim 1, wherein the movement comprises changing a velocity of the ride vehicle.

9. The ride system of claim 1, wherein the ride is configured to be a game played by the rider as the ride vehicle travels along the ride path.

10. The ride system of claim 1, wherein the virtual driving instruction indicates a turning direction and comprises a text message, an object on the ride path, or a symbol.

11. The ride system of claim 1, wherein the ride vehicle is configured to accommodate another rider, wherein the ride system comprises another head mounted display configured to be worn by the another rider, and a marking user input device that enables the another rider to interact with a plurality of augmented reality (AR) objects displayed to the another rider via the another head mounted display, and wherein the control system is configured to adjust a number of the plurality of AR objects displayed to the another rider via the another head mounted display in response to determining that the signal corresponds to the virtual driving instruction.

12. A method of providing entertainment in an amusement park, comprising:
   generating, via a computer graphics generation system of a control system communicatively coupled to a ride vehicle, a gaming environment, wherein the gaming environment comprises a plurality of augmented reality (AR) objects, wherein the ride vehicle is configured carry one or more riders and to travel along a ride path;
   displaying the gaming environment via one or more head mounted displays associated with each of the one or more riders;

receiving, via the control system, a first signal from a steering device configured to be operated by the one or more riders and a second signal from a marking device configured to be operated by the one or more riders; and triggering, via the control system, movement of the ride vehicle based at least in part on the first signal and the second signal.

13. The method of claim 12, wherein the plurality of AR objects comprise a virtual driving instruction object and a target object, the movement of the ride vehicle comprises a first type of movement of the ride vehicle and a second type of movement of the ride vehicle, and wherein triggering the movement of the ride vehicle comprises:

determining that the first signal received from the steering device corresponds to the virtual driving instruction object; and triggering, in response to determining that the first signal received from the steering device corresponds to the virtual driving instruction object, the first type of movement of the ride vehicle;

determining that the second signal received from the marking device corresponds to a virtual interaction with the target object; and triggering, in response to determining that the second signal received from the marking device corresponds to the virtual interaction with the target object, the second type of movement of the ride vehicle.

14. The method of claim 13, wherein the first type of movement comprises changing a velocity of the ride vehicle.

15. The method of claim 13, wherein the first type of movement comprises decreasing a velocity of the ride vehicle.

16. The method of claim 12, wherein the movement comprises changing a velocity of the ride vehicle.

17. The method of claim 12, comprising determining, via the control system, a score for the ride vehicle based at least in part on the first signal and the second signal wherein triggering the movement of the ride vehicle is based at least in part on the score for the ride vehicle.

18. A ride and game control system integrated with a ride vehicle configured to carry one or more riders along a ride track, the ride and game control system comprising:

a game controller configured to:
  receive first input signals from a steering user input device configured to be operated by the one or more riders;
  receive second input signals from at least one marking user input device configured to be operated by the one or more riders;
  determine that the received first input signals correspond to a virtual driving instruction;
  output, in response to determining that the received first input signals correspond to the virtual driving instruction, a first control signal indicative of an instruction to cause a first movement of the ride vehicle;
  determine that the received second input signals correspond to an interaction with an augmented reality (AR) object; and
  output, in response to determining that the received second input signals correspond to the interaction with the AR object, a second control signal indicative of an instruction to cause a second movement of the ride vehicle; and a ride controller communicatively coupled to the game controller and configured to receive the first control signal and the second control signal, and configured to control movement of the ride vehicle based at least in part on the first control signal and the second control signal.

19. The ride and game control system of claim 18, comprising a computer graphics generation system communicatively coupled to the game controller and to a head mounted display configured to be worn by the rider, wherein the computer graphics generation system is configured to generate and display the virtual driving instruction and the AR object via the head mounted display.

20. The ride and game control system of claim 18, wherein the ride controller is configured to adjust a velocity of the ride vehicle based at least in part on the first control signal or the second control signal.

* * * * *